US009478088B2

(12) United States Patent
Lee

(10) Patent No.: US 9,478,088 B2
(45) Date of Patent: Oct. 25, 2016

(54) SMART KEY SYSTEM USING MOVEMENT PATTERN RECOGNITION OF MOBILE DEVICE AND OPERATION METHOD THEREOF

(71) Applicant: Hyundai Mobis Co., Ltd., Yongin-si (KR)

(72) Inventor: Sang Gwon Lee, Incheon (KR)

(73) Assignee: Hyundai Mobis Co., Ltd., Seoul (KR)

( * ) Notice: Subject to any disclaimer, the term of this patent is extended or adjusted under 35 U.S.C. 154(b) by 176 days.

(21) Appl. No.: 14/294,813

(22) Filed: Jun. 3, 2014

(65) Prior Publication Data

US 2015/0042454 A1 Feb. 12, 2015

(30) Foreign Application Priority Data

Aug. 7, 2013 (KR) ........................ 10-2013-0093640

(51) Int. Cl.
*G05B 11/01* (2006.01)
*G07C 9/00* (2006.01)

(52) U.S. Cl.
CPC . *G07C 9/00182* (2013.01); *G07C 2009/00206* (2013.01); *G07C 2009/00793* (2013.01); *G07C 2209/63* (2013.01)

(58) Field of Classification Search
CPC .......... G07C 9/00309; G07C 2209/63; G06K 9/00771
USPC .............................................. 340/5.72, 12.54
See application file for complete search history.

(56) References Cited

U.S. PATENT DOCUMENTS

| | | | | | |
|---|---|---|---|---|---|
| 4,695,942 | A * | 9/1987 | Levine | G05B 19/10 | 700/83 |
| 4,719,460 | A * | 1/1988 | Takeuchi | B60R 25/24 | 180/287 |
| 4,958,226 | A * | 9/1990 | Haskell | H04N 19/51 | 375/240.12 |
| 7,629,876 | B2 | 12/2009 | Nagai et al. | | |
| 8,446,262 | B2 * | 5/2013 | Dai | G08C 17/02 | 340/12.22 |
| 2008/0048846 | A1 * | 2/2008 | Nagai | B60R 25/24 | 340/426.17 |
| 2014/0082569 | A1 * | 3/2014 | Borgman | G06F 21/35 | 715/863 |

FOREIGN PATENT DOCUMENTS

| | | | |
|---|---|---|---|
| CN | 101131772 | A | 2/2008 |
| CN | 102903214 | A | 1/2013 |
| JP | 2006-348513 | A | 12/2006 |
| JP | 2012-102536 | A | 5/2012 |

OTHER PUBLICATIONS

Chinese Office Action issued on Apr. 5, 2016, in counterpart Chinese Application No. 201410157913.4. (6 pages in Chinese).

* cited by examiner

*Primary Examiner* — Vernal Brown
(74) *Attorney, Agent, or Firm* — NSIP Law

(57) ABSTRACT

Provided is a smart key system using movement pattern recognition of a mobile terminal includes a mobile terminal configured to continuously transmit position information generated when a position is moved according to manipulation of a user, and a control module configured to acquire a movement pattern of the mobile terminal using the position information received from the mobile terminal and unlock a door of a vehicle when the acquired movement pattern is matched with a previously stored preset pattern.

17 Claims, 4 Drawing Sheets

SMART KEY SYSTEM USING MOVEMENT PATTERN RECOGNITION OF MOBILE DEVICE AND OPERATION METHOD THEREOF

CROSS-REFERENCE TO RELATED APPLICATIONS

This application claims priority under 35 U.S.C. §119 to Korean Patent Application No. 10-2013-0093640, filed on Aug. 7, 2013, the disclosure of which is incorporated herein by reference in its entirety.

TECHNICAL FIELD

The present invention relates to smart key systems, and more particularly, to a smart key system for recognizing a movement pattern of a mobile terminal generated under control of a user to control a vehicle.

BACKGROUND

In general, a smart key system is a system in which when a driver of a vehicle with a smart key take a necessary action, a vehicle embedded system senses the action to control operations of the vehicle, and includes a Remote Keyless Entry (RKE) system and a Passive Keyless Entry (PKE) system. The RKE system is a system that can lock or unlock a door wirelessly and remotely without a key, and the PKE system is a system in which a driver or owner of a vehicle positioned near the vehicle wirelessly executes operations of locking, unlocking, and starting of the vehicle. Here the smart key may be typically referred to as a “Fob key,” and shortly referred to as a “Fob.” The smart key system of the vehicle includes multiple LF antennas for covering, as a communication region, a vehicle outdoor region in addition to a vehicle indoor region, a RF antenna for receiving an RF signal from a smart key, and an SMK unit. The SMK unit in the smart key system transmits an LF signal through an LF antenna to detect a fob in the vicinity of the vehicle. When the LF signal is received, the smart key transmits an RF signal as a response signal, and the SMK unit determines whether the RF signal received through the RF antenna is matched with a previously stored vehicle identification number. If the RF signal is matched with the vehicle identification number, the SMK unit performs a function of driver/assist/trunk passive access depending on circumstances.

However, in the smart key system, if the smart key information is just matched with the vehicle identification number, the vehicle may be controlled irrespective of who a user is. Thus even when through a stranger manipulates a smart key because of theft or loss, the vehicle control may be allowed such as locking/unlocking of a door, locking/unlocking of a trunk, and starting of a vehicle.

SUMMARY

Accordingly, the present invention provides a technical solution for preventing a vehicle from being controlled by a user having no authority that illicitly use a smart key.

In one general aspect, a smart key system using movement pattern recognition of a mobile terminal includes a mobile terminal configured to continuously transmit position information generated when a position is moved by manipulation of a user; and a control module configured to acquire a movement pattern of the mobile terminal using the position information received from the mobile terminal and unlock a door of a vehicle when the acquired movement pattern is matched with a previously stored preset pattern.

In another general aspect, a method of recognizing, by a control module of a smart key system, a movement pattern of a mobile terminal to unlock a door of a vehicle according to another embodiment of the present invention includes receiving pieces of position information of the mobile terminal transmitted in addition to a door unlock request signal when receiving the door unlock request signal from the mobile terminal, acquiring a movement pattern of the mobile terminal based on the received pieces of position information, comparing the acquired movement pattern with the preset pattern stored in the memory, and unlocking the door of the vehicle when the two patterns are matched as a result of the comparison.

Other features and aspects will be apparent from the following detailed description, the drawings, and the claims.

DETAILED DESCRIPTION OF EMBODIMENTS

Figure 1:
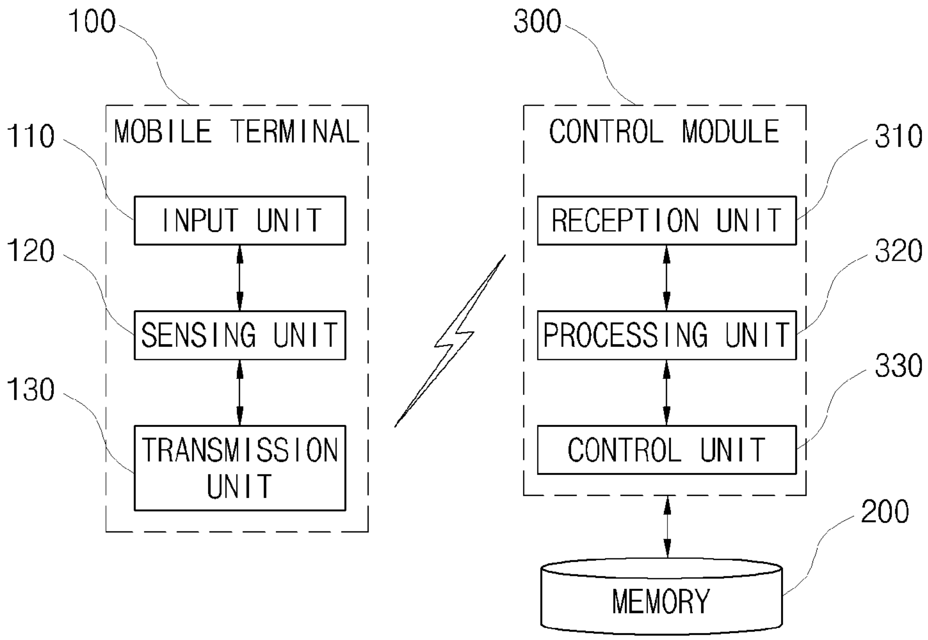
FIG. 1 is a block diagram illustrating a smart key system using movement pattern recognition of a mobile terminal according to an embodiment of the present invention.

Hereinafter, embodiments of the present invention will be described in detail with reference to the accompanying drawings.

A smart key system using movement pattern recognition of a mobile terminal according to an embodiment of the present invention includes a mobile terminal configured to continuously transmit position information generated when a position is moved by manipulation of a user; and a control module configured to acquire a movement pattern of the mobile terminal using the position information received from the mobile terminal and unlock a door of a vehicle when the acquired movement pattern is matched with a previously stored preset pattern.

Here, the position information is coordinate data measured by an inertial tri-axis acceleration sensor equipped in the mobile terminal.

When converting pieces of coordinate data, received from the mobile terminal, into a plurality of vector values to acquire the movement pattern, the control module converts the pieces of coordinate data into the plurality of vector values having an opposite direction of a movement direction of the mobile terminal to acquire the movement pattern.

The mobile terminal includes a door unlock switch, and when an on-time of the door unlock switch is greater than a first threshold time, the mobile terminal transmits a door unlock request signal during the on-time and transmits the position information in addition to the door unlock request signal. In addition, the mobile terminal lights a lamp at a transmission start timing and a transmission end timing of the position information and notifies the user that the position information is transmitted.

The control module receives the position information while a door unlock request signal is being received from the mobile terminal.

When the door unlock request signal is received from the mobile terminal for a first threshold time or more, the control module receives the position information in addition to the door unlock request signal while receiving the door unlock request signal.

In a case where the preset pattern is not previously stored, if the control module receives the door unlock request signal from the mobile terminal, and then within a certain time, re-receives the door unlock request signal for a second threshold time or more, the control module stores, as the preset pattern, a movement pattern acquired based on the position information received in addition to the door unlock request signal.

In addition, the smart key system further includes a memory for storing the preset pattern, which is used to determine whether to unlock a door of the vehicle. The control module receives twice the door unlock request signal having a high period of time of less than a second threshold time, from the mobile terminal, re-receives the door unlock request signal for the second threshold time or more, checks whether the movement pattern acquired based on the position information received in addition to the door unlock request signal of the second threshold time or more is matched with the preset pattern, and then if the two patterns are matched as a result of the check, deletes the preset pattern stored in the memory.

A method of recognizing, by a control module of a smart key system, a movement pattern of a mobile terminal to unlock a door of a vehicle according to another embodiment of the present invention includes receiving pieces of position information of the mobile terminal transmitted together with a door unlock request signal when receiving the door unlock request signal from the mobile terminal, acquiring a movement pattern of the mobile terminal based on the received pieces of position information, comparing the acquired movement pattern with the preset pattern stored in the memory, and unlocking the door of the vehicle when the two patterns are matched as a result of the comparison.

The receiving includes, when the door unlock request signal is received from the mobile terminal for a first threshold time or more, receiving the position information transmitted together with the received door unlock request signal and receiving, as the pieces of position information, pieces of coordinate data measured by an inertial tri-axis acceleration sensor equipped in the mobile terminal.

The acquiring of a movement pattern comprises converting the pieces of coordinate data, received from the mobile terminal, into a plurality of vector values to acquire the movement pattern, and reading a pre-stored corresponding program to acquire the movement pattern by using the pieces of coordinate data.

In addition, the method of unlocking the door of the vehicle further includes receiving the door unlock request signal from the mobile terminal and then within a certain time, re-receiving the door unlock request signal for a second threshold time or more, and storing, as the preset pattern, a movement pattern acquired based on the position information received in addition to the door unlock request signal while re-receiving the door unlock request signal.

Furthermore, the method of unlocking the door of the vehicle further comprises receiving twice the door unlock request signal having a high period of time of less than a second threshold time, from the mobile terminal and then re-receiving the door unlock request signal for the second threshold time or more, checking whether the movement pattern acquired based on the position information received in addition to the door unlock request signal is matched with the preset pattern while re-receiving the door unlock request signal of the second threshold time or more, and when the two patterns are matched as a result of the check, deleting the preset pattern stored in the memory.

The above and other aspects of the present invention will be more apparent through exemplary embodiments described with reference to the accompanying drawings. Hereinafter, the present invention will be described in detail through the embodiments of the present invention so that those skilled in the art can easily understand and implement the present invention.

FIG. 1 is a block diagram illustrating a smart key system using movement pattern recognition of a mobile terminal according to an embodiment of the present invention. The smart key system according to an embodiment of the present invention can prevent a user with no authority from controlling a vehicle, by unlocking a door of the vehicle when the movement pattern in which a vehicle fob is moved by manipulation of a user is matched with the preset pattern. Furthermore, according to another embodiment of the present invention, the smart key system includes the inertial tri-axis acceleration sensor in a vehicle fob in order to acquire the movement pattern of the vehicle fob. Thus, it is possible to remove the components such as a slide switch, a gyro sensor, and a gravity sensor to reduce the size of the fob, thereby enhancing mobility to provide for the convenience of the user. To this end, the smart key system using movement pattern recognition of the mobile terminal includes a mobile terminal 100, a memory 200, and a control module 300, as shown in FIG. 1.

The mobile terminal 100 may be a smart key (Fob) of the smart key system, which is configured to transmit an operation request signal to the control module 300 of the vehicle according to manipulation of the user. Alternatively, the mobile terminal 100 may be a mobile communication terminal of a user, which has an established communication connection with the control module 300 of the vehicle.

In addition, the mobile terminal 100 may transmits position information of the mobile terminal 100 generated according to manipulation of the user. For the above-described operations, the mobile terminal 100 may include an input unit 110, a sensing unit 120, and a transmission unit 130. Furthermore, when data such as the position information or an operation request signals is transmitted, the mobile terminal 100 may further include a lamp module (e.g. an LED module (not shown)) in order to notify the user of the start and the end of the data transmission.

The input unit 110 may be configured to receive an operation request from a user and include a button (switch). The input unit 110 may include a door lock button, a door unlock button, a panic button for generating an alarm sound, and a trunk/tail gate unlock button. When one input is received through the plurality of buttons of the input unit 110 according to manipulation of the user, an operation request signal may be generated corresponding to the input.

Figure 2:
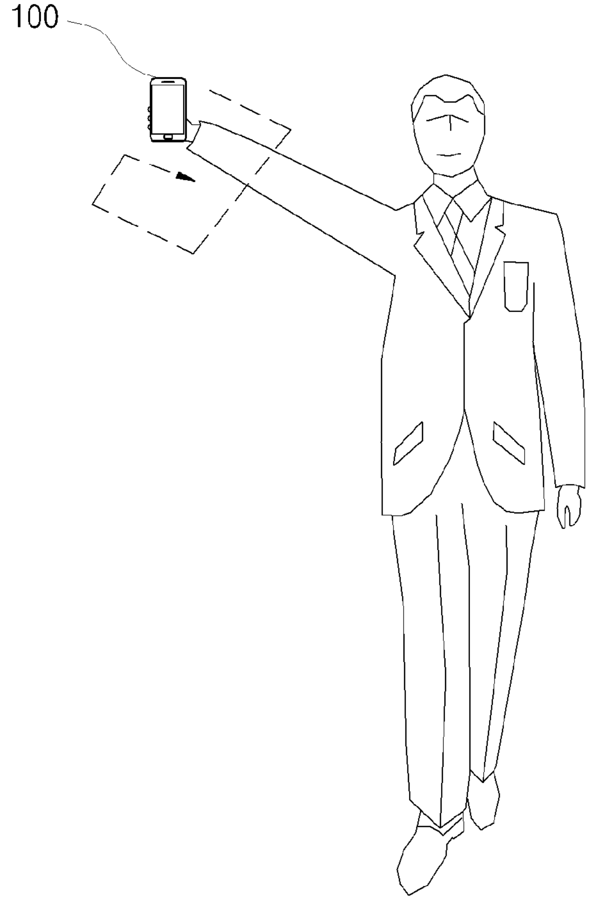
FIG. 2 is an exemplary diagram illustrating movement of the mobile terminal according to an embodiment of the present invention.

The sensing unit 120 may be an inertial tri-axis acceleration sensor, which is configured to generate position information of the mobile terminal 100. The inertial tri-axis acceleration sensor of the sensing unit 120 may be embedded in the mobile terminal 100. The sensing unit 120 configured to generate three-dimensional coordinate data (x, y, z) when the position of the mobile terminal 100 is moved by manipulation of a user as shown in FIG. 2. Preferably, when a door unlock request signal is generate by the input unit 110, the sensing unit 120 may generate continuously the coordinate data.

The transmission unit 130 may be configured to transmit a request signal generated by the input unit 110 and the position information generated by the sensing unit 120 to the control module 300 of the vehicle and include an RF antenna for Radio Frequency (RF) communication. For example, the transmission unit 130 may transmit signals and information to the control module 300 of the vehicle having previously established communication compatibility. Preferably, the transmission unit 130 may transmit position information generated by the sensing unit 120 to the vehicle while the door unlock button of the input unit 110 is turned on by input of the user to transmit the door unlock request signal. Here, when the door unlock request signal is generated from the input unit 110 for more than a first threshold time (for example, 100 ms), the transmission unit 130 may transmit the position information generated by the sensing unit 120 to the control module 300 of the vehicle while the door unlock request signal is generated. If the door unlock request signal is generated by the input signal 110 for less than the first threshold time, the transmission unit 130 does not transmit the request signal and position information.

Figure 3:
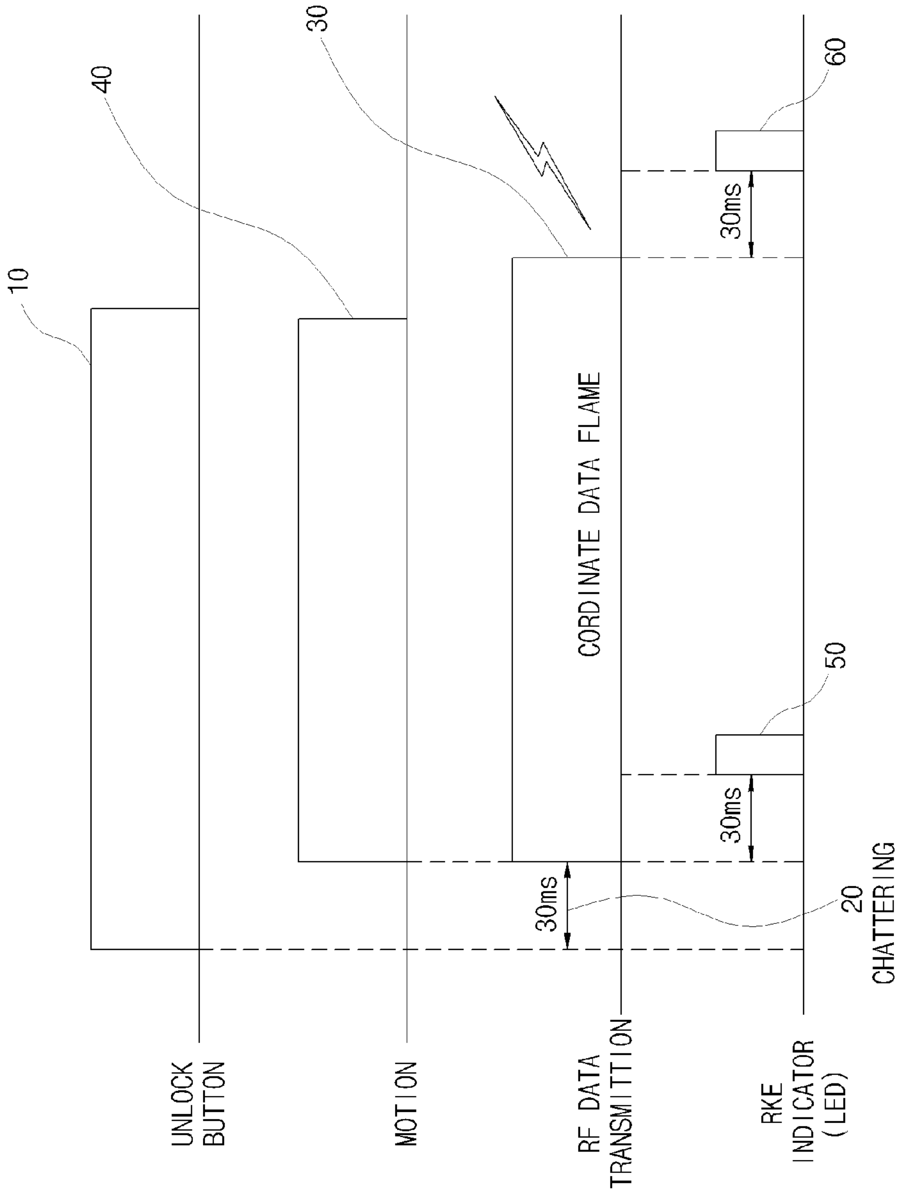
FIG. 3 is an exemplary diagram illustrating a data transfer operation of a mobile terminal according to an embodiment of the present invention.

That is, as shown in FIG. 3, when the door unlock request signal (Unlock Button) 10 is generated at the input unit 110 for more than the first threshold time according to manipulation of the door unlock button by the user, the above-described mobile terminal 100 transmits a door unlock request signal (RF Data transmission) 30 in a form of RF data through the transmission unit 130 after chattering time 20 (for example, 30 ms). In this case, the mobile terminal 100 may transmit position information (Motion) 40 generated by the sensing unit 120 according to manipulation of a user to the control module of the vehicle through the transmission unit 130 while the door unlock request signal 30 is transmitted through the input unit 110.

In addition, when an RKE Indicator signal 50 is generated after a certain time (for example, 30 ms) has passed since the transmission of the RF data through the transmission unit 130 was started, the mobile terminal 100 may blink an LED once using a lamp module to inform the user that the data transmission is started. In addition, when an RKE Indicator signal 60 is generated after a certain time (for example, 30 ms) has passed since the transmission of the RF data through the transmission unit 130 was ended, the mobile terminal 100 may blink an LED once using a lamp module to inform the user that the data transmission is ended.

The memory 200 may be a non-volatile memory, which is configured to store data. A preset pattern used to determine whether to unlock the door of the vehicle may be stored in the memory 200. When the vehicle is shipped from the factory, the preset pattern may not be stored in the memory 200. Subsequently, position information may be received from the mobile terminal 100 that can communicate with the vehicle according to manipulation of storing a preset pattern by a user and then the preset pattern may be received. In addition, the preset pattern may be deleted or reset according to manipulation of the mobile terminal 100 by the user. The storage and deletion of the preset pattern in the memory 200 will be described in detail when the control module 300 is described.

The control module 300 may be a Body Control Module (BCM) that performs overall operations of the smart key system of the vehicle, which is configured to recognize a position movement pattern of the mobile terminal 100 to unlock the door of the vehicle. To perform the above-described operations, the control module 300 may include a reception unit 310, a processing unit 320, and a control unit 330.

The reception unit 310 may include an RF antenna, which is configured to receive data from the transmission unit 130 of the mobile terminal 100. The reception unit 310 may receive an operation request signal and position information from the transmission unit 130 of the mobile terminal 100. Specifically, while receiving a door unlock request signal from the transmission unit 130 of the mobile terminal 100, the reception unit 310 may receive position information together with the door unlock request signal. If the door unlock request signal is received from the transmission unit 103 of the mobile terminal 100 for less than the first threshold time (e.g., 100 ms), the reception unit 310 may not receive the position information.

The processing unit 320 is configured to process the position information received through the reception unit 310 to acquire a movement pattern of the mobile terminal 100. Specifically, the processing unit 320 converts the coordinate data received through the reception unit 310 into vector values. In this case, the vector values obtained by the processing of the processing unit 230 are converted as vector values each having a direction opposite to a direction of the mobile terminal 100 that is moved by the user. In addition, the processing unit 320 may acquire the movement pattern in consideration of a predetermined error range. Here, the processing unit 320 may read a pattern interpretation program previously stored in a separate storage medium or memory 200 to acquire the movement pattern based on the coordinate data received from the mobile terminal 100.

When the movement pattern of the mobile terminal 100 acquired by the processing unit 320 is matched with the preset pattern previously stored in the memory 200, the control unit 330 unlocks the door of the vehicle. Specifically, the control unit 330 checks whether the movement pattern of the mobile terminal 100 acquired by the processing unit 320 is matched with the preset pattern previously stored in the memory 200. When the movement pattern is matched with the preset pattern as a result of the check, the control unit 330 may transmit an step Signal to a control unit, such as a door lock/unlock control unit for controlling the locking or unlocking of the door of the vehicle such that the door of the vehicle is unlocked.

As such, when the user inputs the movement pattern of the mobile terminal 100 that is matched with the preset pattern previously stored in the memory 200, the control module 300 may perform an operation of unlocking the door of the vehicle.

Here, the preset pattern may be not set when the vehicle is shipped, and may be set by a user, such as a vehicle owner, after the shipment to be stored in the memory 200. Specifically, in a case where the preset pattern is not stored in the memory 200, the control module 300 checks whether to receive once the door unlock request signal from the mobile terminal 100, and then with in certain time (for example, one second), re-receive the door unlock request signal of the second threshold time or more (for example, two seconds). For example, if the door unlock request signal is received once, and within one second, the door unlock request signal is re-received for more than two seconds, the control module 300 may set, as the preset pattern, a pattern acquired based on the position information received from the mobile terminal 100 in addition to the door unlock request signal and store the preset pattern in the memory 200 for two seconds, for which the door unlock request signal is re-received. That is, in order to set a preset pattern, the user manipulates and moves a position of the mobile terminal 100 in a desired pattern while pressing once the door unlock button of the mobile terminal 100 and then within one second, pressing (inputting) the door unlock button for two seconds or more, and then releases the door unlock button.

If the door unlock request signal is received once, and then within one second, the door unlock request signal is re-received for less than two seconds, the control module 300 does not set a preset pattern based on the position information even when the position information is received from the mobile terminal 100 while the door unlock request signal is re-received.

Furthermore, the mobile terminal 100 may brink an LED periodically while transmitting the position information in addition to the door unlock request signal of two seconds or more, to the control module 300 to notify the user that the data for setting a setting pattern is transmitted to the control module 300. Subsequently, when the door unlock button is released by the user, the mobile terminal 100 may brink an LED once to notify the user that the transmission of data to the control module 300 is ended. For example, when a preset-pattern setting completion signal is received from the control module 300, the mobile terminal 100 may blink an LED once to inform the user that the preset pattern has been set.

In addition, the control module 300 may initialize (delete) the preset pattern stored in the memory 200. Specifically, in a case where the preset pattern is stored in the memory 200, the control module 300 checks whether to receive the door unlock request signal from the mobile terminal 100 twice and then within a certain time (for example, one second), re-receive the door unlock request signal of the second threshold time or more (for example, two seconds). When the door unlock request signal is received twice, and then within one second, the door unlock request signal is re-received for more than two seconds, the control module 300 acquires the movement pattern of the mobile terminal 100 using the position information received from the mobile terminal 100 in addition to the door unlock request signal while the door unlock request signal is re-received. When the acquired movement pattern of the mobile terminal 100 is matched with the preset pattern previously stored in the memory 200, the control module 300 deletes the preset pattern stored in the memory 200.

That is, in order to delete the preset pattern, the user manipulates and moves the position of the mobile terminal 100 in a preset pattern while pressing twice the door unlock button of the mobile terminal 100 and then within one second, pressing (inputting) the door unlock button for two seconds or more, and then releases the door unlock button.

Furthermore, when the door unlock button is released, the mobile terminal 100 may blink an LED five times to notify the user that the preset pattern is initialized by the control module 300. For example, when a preset-pattern initialization completion signal is received from the control module 300, the mobile terminal 100 may blink an LED five times.

As such, according to an embodiment of the present invention, it is advantageous that a user having no authority and acquiring the vehicle fob cannot control the vehicle, by unlocking the door of the vehicle only when the movement pattern in which the vehicle fob is moved by manipulation of a user is matched with the preset pattern.

Moreover, it is also possible to remove the components such as a slide switch, a gyro sensor, and a gravity sensor to reduce the size of the fob by including the inertial tri-axis acceleration sensor in the vehicle fob in order to acquire the movement pattern of the vehicle fob, thereby enhancing mobility to provide for the convenience of the user.

Figure 4:
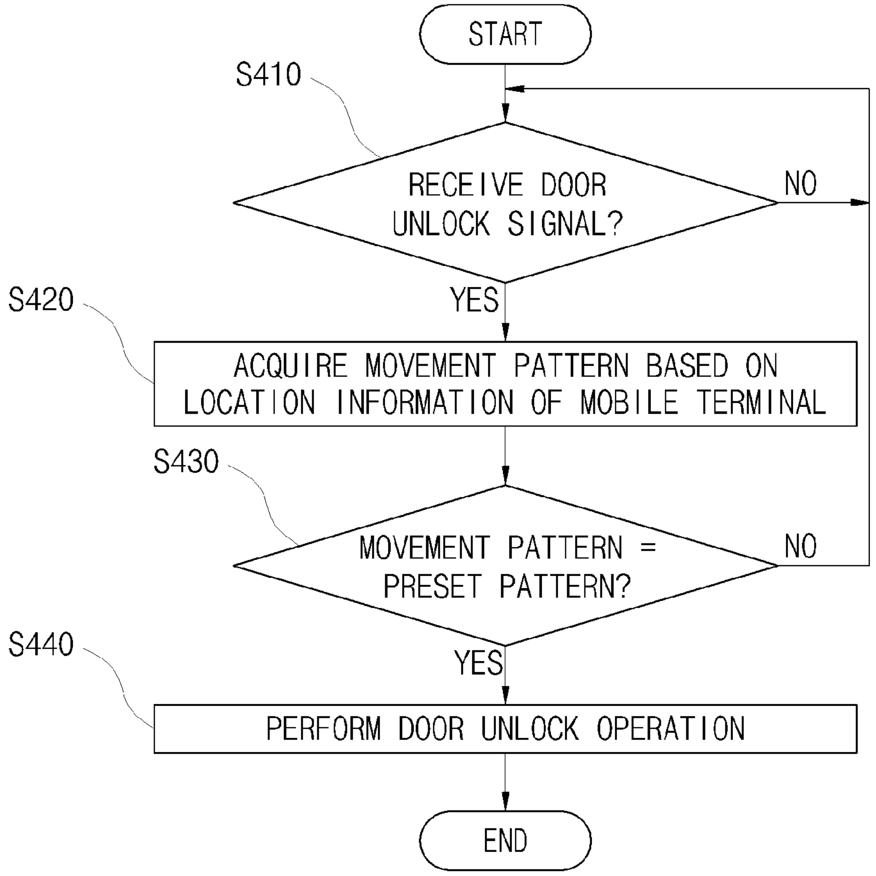
FIG. 4 is a flowchart showing an operation method of a smart key system using movement pattern recognition of a mobile terminal according to another embodiment of the present invention.

FIG. 4 is a flowchart illustrating a method of operating a smart key system using mobility pattern recognition of the mobile terminal according to an embodiment of the present invention.

In step S410, the control module 300 checks whether to receive a door unlock request signal from the mobile terminal 100. For example, when the door unlock button among the plurality of buttons of the mobile terminal 100 is pressed by manipulation of the user, the control module 300 may receive the door unlock request signal from the mobile terminal 100. In this case, the control module 300 may receive data via RF communication with the mobile terminal 100.

When it is checked in step S410 that the door unlock request signal is received from the mobile terminal 100, the control module 300 receives the position information of the mobile terminal 100 to acquire the movement pattern in step S420. For example, the control module 300 may acquire the movement pattern based on the position information received in addition to the door unlock request signal while receiving the door unlock request signal from the mobile terminal 100. Here, the position information received from the mobile terminal 100 may be three-dimensional (x, y, z) coordinate data generated by the inertial three-axis acceleration sensor included in the mobile terminal 100. In this case, when the door unlock request signal is received for more than the first threshold time (for example, 100 ms), the control module 300 may receive the position information from the mobile terminal 100. That is, though the door unlock request signal is received, when the door unlock request signal is received for less than the first threshold time (for example, 100 ms), the control module 300 does not receive the position information from the mobile terminal 100. The control module 300 may convert the coordinate data included in the received position information into vector values to acquire the move pattern of the mobile terminal 100. In this case, the control module 300 may read a pattern interpretation program previously stored in a separate storage medium or memory 200 to acquire the movement pattern of the mobile terminal 100 using the coordinate data.

In step S430, the control module 300 checks whether to match the movement pattern acquired in step S420 with the preset pattern. For example, the control module 300 checks whether to match the movement pattern of the mobile terminal 100 acquired in step S420 with the setting pattern previously stored in the memory 200. Here, the preset pattern previously stored in the memory 200 may be a preset pattern that is moved to determine whether to unlock the door of the vehicle, and preset by the user. The preset pattern may not be set when the vehicle is initially shipped from the factory. Subsequently, position information may be received from the mobile terminal 100 that can communicate with the vehicle according to manipulation of storing a preset pattern by a user and then the preset pattern may be received in the memory 200. The preset pattern may be deleted and reset by manipulation of the user.

When it is checked in step S430 to match the movement pattern with the preset pattern, in step S440, the control module 300 performs an operation of unlocking the door of the vehicle. For example, when the movement pattern of the mobile terminal 100 is matched with the preset pattern previously stored in the memory, the control unit 300 may transmit an step Signal to a control unit (for example, a door locking/unlocking control unit) for controlling locking/unlocking operations of the vehicle such that the door of the vehicle is unlocked.

As such, according to an embodiment of the present invention, it is advantageous that a user having no authority and acquiring the vehicle fob cannot control the vehicle, by unlocking the door of the vehicle only when the movement pattern in which the vehicle fob is moved by manipulation of a user is matched with the preset pattern.

Moreover, it is also possible to remove the components such as a slide switch, a gyro sensor, and a gravity sensor to reduce the size of the fob by including the inertial tri-axis acceleration sensor in the vehicle fob in order to acquire the movement pattern of the vehicle fob, thereby enhancing mobility to provide for the convenience of the user.

The present disclosure has been described based on various embodiments. A person having ordinary skill in the art will understand that the present disclosure may be modified without departing from the spirit of the present disclosure. Therefore, the disclosed embodiments should be interpreted not in a limiting aspect but in a descriptive aspect. The scope of the present disclosure is not defined by the above description but by the appended claims, and all differences equivalent to the present disclosure should be interpreted to be included in the present disclosure.

What is claimed is:

1. A smart key system using movement pattern recognition of a mobile terminal, the smart key system comprising:

a mobile terminal configured to continuously transmit position information generated as a position is moved by manipulation of a user; and a control module configured to acquire a movement pattern of the mobile terminal using the position information received from the mobile terminal and unlock a door of a vehicle when the acquired movement pattern is matched with a previously stored preset pattern.

2. The smart key system of claim 1, wherein the position information is coordinate data measured by an inertial tri-axis acceleration sensor equipped in the mobile terminal.

3. The smart key system of claim 2, wherein when converting pieces of coordinate data, received from the mobile terminal, into a plurality of vector values to acquire the movement pattern, the control module converts the pieces of coordinate data into the plurality of vector values having an opposite direction of a movement direction of the mobile terminal to acquire the movement pattern.

4. The smart key system of claim 1, wherein the mobile terminal includes a door unlock switch, and when an on-time of the door unlock switch is greater than a first threshold time, transmits a door unlock request signal during the on-time and transmits the position information in addition to the door unlock request signal.

5. The smart key system of claim 1, wherein the control module receives the position information while a door unlock request signal is being received from the mobile terminal.

6. The smart key system of claim 1, wherein when a door unlock request signal of the first threshold time or more is received from the mobile terminal, the control module receives the position information in addition to the door unlock request signal.

7. The smart key system of claim 1, wherein the mobile terminal blinks a lamp at a transmission start timing and a transmission end timing of the position information to notify the user that the position information has been transmitted.

8. The smart key system of claim 1, wherein in a case where the preset pattern is not previously stored, when the control module receives a door unlock request signal from the mobile terminal and then within a certain time re-receives the door unlock request signal for more than a second threshold time, the control module stores, as the preset pattern, a movement pattern acquired based on the position information received in addition to the door unlock request signal.

9. The smart key system of claim 1, further comprising a memory configured to store the preset pattern used to determine whether to unlock the door of the vehicle, wherein the control module receives twice the door unlock request signal having a high period of time of less than a second threshold time, from the mobile terminal, re-receive the door unlock request signal of the second threshold time or more, checks whether the movement pattern acquired based on the position information received in addition to the door unlock request signal of the second threshold time or more is matched with the preset pattern, and then when the two patterns are matched as a result of the check, deletes the preset pattern stored in the memory.

10. The smart key system of claim 1, wherein the previously stored movement pattern was sent from the mobile terminal or another mobile terminal and was sent with an instruction to configure the control module with the previously stored movement pattern.

11. The smart key system of claim 1, wherein the acquired movement pattern is matched with a previously stored preset pattern based upon a predetermined error range.

12. A method of recognizing, by a control module of a smart key system, a movement pattern of a mobile terminal to unlock a door of a vehicle, the method comprising:

receiving pieces of position information of the mobile terminal transmitted in addition to a door unlock request signal when receiving the door unlock request signal from the mobile terminal;

acquiring a movement pattern of the mobile terminal based on the received pieces of position information;

comparing the acquired movement pattern with the preset pattern stored in the memory; and unlocking the door of the vehicle when the two patterns are matched as a result of the comparison.

13. The method of claim 12, wherein the receiving comprising, when a door unlock request signal is received from the mobile terminal for a first threshold time or more, receiving the position information in addition to the door unlock request signal.

14. The method of claim 12, further comprising:

receiving the door unlock request signal from the mobile terminal and then within a certain time, re-receiving the door unlock request signal for a second threshold time or more; and storing, as the preset pattern, a movement pattern acquired based on the position information received in addition to the door unlock request signal while re-receiving the door unlock request signal.

15. The method of claim 12, further comprising:

receiving twice the door unlock request signal having a high period of time of less than a second threshold time, from the mobile terminal and then re-receiving the door unlock request signal for the second threshold time or more;

checking whether the movement pattern acquired based on the position information received in addition to the door unlock request signal is matched with the preset pattern while re-receiving the door unlock request signal of the second threshold time or more; and when the two patterns are matched as a result of the check, deleting the preset pattern stored in the memory.

16. The method of claim 12, wherein the receiving comprises receiving, as the pieces of position information, pieces of coordinate data measured by an inertial tri-axis acceleration sensor equipped in the mobile terminal.

17. The method of claim 16, wherein the acquiring of a movement pattern comprises converting the pieces of coordinate data, received from the mobile terminal, into a plurality of vector values to acquire the movement pattern, and reading a pre-stored corresponding program to acquire the movement pattern by using the pieces of coordinate data.

* * * * *